(12) United States Patent
Ashmawi et al.

(10) Patent No.: US 12,091,169 B2
(45) Date of Patent: Sep. 17, 2024

(54) THREE-DIMENSIONAL TEXTILE PREFORMS AND COMPOSITE PARTS COMPRISING TEXTILE PREFORMS

(71) Applicant: The Boeing Company, Chicago, IL (US)

(72) Inventors: Waeil M. Ashmawi, Bellevue, WA (US); Zayd I. Abdel-Kamel, Bothell, WA (US); Sahrudine Apdalhaliem, Seattle, WA (US)

(73) Assignee: The Boeing Company, Arlington, VA (US)

( * ) Notice: Subject to any disclaimer, the term of this patent is extended or adjusted under 35 U.S.C. 154(b) by 79 days.

(21) Appl. No.: 17/805,795

(22) Filed: Jun. 7, 2022

(65) Prior Publication Data
US 2022/0402590 A1 Dec. 22, 2022

Related U.S. Application Data

(60) Provisional application No. 63/202,593, filed on Jun. 17, 2021.

(51) Int. Cl.
| | |
|---|---|
| *B64C 3/18* | (2006.01) |
| *B29C 70/68* | (2006.01) |
| *B29K 105/00* | (2006.01) |
| *B29K 105/08* | (2006.01) |
| *B29L 31/30* | (2006.01) |

(52) U.S. Cl.
CPC ............ *B64C 3/182* (2013.01); *B29C 70/682* (2013.01); *B29K 2105/0845* (2013.01); *B29K 2105/253* (2013.01); *B29L 2031/3085* (2013.01)

(58) Field of Classification Search
CPC .................. B64C 3/182; B29C 70/682; B29K 2105/0845; B29K 2105/253; B29L 2031/3085
See application file for complete search history.

(56) References Cited

U.S. PATENT DOCUMENTS

2003/0178738 A1* 9/2003 Staub ................. B29D 99/0007
264/258

OTHER PUBLICATIONS

European Patent Office, Extended European Search Report Issued in Application No. 22179462.1, Nov. 18, 2022, Germany, 7 pages.
"Albany Engineered Composites: Weaving the Future in 3-D," Composites World, Available Online at https://www.compositesworld.com/articles/albany-engineered-composites-weaving-the-future-in-3-d, Mar. 4, 2014, 9 pages.

(Continued)

*Primary Examiner* — Tye William Abell
(74) *Attorney, Agent, or Firm* — Alleman Hall & Tuttle LLP

(57) ABSTRACT

Examples are disclosed herein that relate to vehicles, composite parts, and three-dimensional (3D) textile preforms for composite parts. In one example, a 3D textile preform for a composite part comprises a flange portion and a stiffener portion extending upwardly from the flange portion. The stiffener portion comprises a first wall portion that extends from the flange portion and a second wall portion that extends from the flange portion at a location spaced from the first wall portion. A connecting portion connects the first wall portion and the second wall portion at a location spaced from the flange portion.

26 Claims, 5 Drawing Sheets

(56) References Cited

OTHER PUBLICATIONS

"The Leap Engine," CFM Engines, Available Online at https://www.cfmaeroengines.com/engines/leap/, Available as Early as Aug. 1, 2012, 13 pages.
Mouritz, A. et al., "Review of applications for advanced three-dimensional fibre textile composites," Composites Part A: Applied Science and Manufacturing, vol. 30, No. 12, Dec. 1999, 17 pages.
Naouar, N. et al., "3D composite reinforcement meso F.E.analyses based on X-ray computed tomography," Composite Structures, vol. 132, Nov. 15, 2015, 12 pages.
"Kompozit: 3D Weaving, Carbon Fiber, Composites, Preforms," Erginer Seramik, Available Online at https://www.erginer.com.tr/kompozit/, Retrieved on Feb. 4, 2021, 3 pages.
Stig, F., "An Introduction to the Mechanics of 3D-Woven Fibre Reinforced Composites," Thesis, KTH School of Engineering Sciences, Apr. 2009, 40 pages.
Clarke, S., "3D Woven Textiles for Composite Applications," Utah Advanced Materials and Manufacturing Initiative, Available Online at https://www.uammi.org/new/wp-content/uploads/2018/03/06-Steve-Clarke-TEAM-3D-Weaving-UAMMI-Slides-032018.pdf, Mar. 20, 2018, 23 pages.
European Patent Office, Office Action Issued in Application No. 22179462.1, May 28, 2024, 3 pages.

\* cited by examiner

THREE-DIMENSIONAL TEXTILE PREFORMS AND COMPOSITE PARTS COMPRISING TEXTILE PREFORMS

CROSS REFERENCE TO RELATED APPLICATIONS

This application claims priority to U.S. Provisional Patent Application Ser. No. 63/202,593, filed Jun. 17, 2021, the entirety of which is hereby incorporated herein by reference for all purposes.

BACKGROUND

Vehicles include many different structural components that are under force during use. For example, skin panels of an aircraft form a surface that is acted upon by aerodynamic forces during flight. As such, the aircraft includes structures configured to reinforce the skin panels and impart aerodynamic forces acting upon the skin panels to load-bearing support structures. For example, structures referred to as "stringers" are used to stiffen skin panels and transmit aerodynamic forces acting upon the skin panels to load-bearing structures such as spars and/or ribs. These stiffeners can take various forms. As examples, some stiffeners have a blade-shaped cross section with a flange and a web, while others have a hollow interior and a cross-sectional shape akin to a top hat.

In some vehicles, one or more structural components are made from composite materials, such as a carbon fiber/epoxy system. In such vehicles, skin and stiffeners are formed as a unitary structure by bonding, co-curing or infusing the skin and stiffeners together. However, forming such unitary composite parts can pose various challenges. For example, a fiber layer used in a composite part can have limits on formability, such as a minimum radius of curvature to which it can be bent without damaging the fiber, introducing defects into the composite part, creating a void (e.g., a deltoid) at the radius, or distorting surrounding material. Radius fillers can be employed at intersections between surfaces where the fiber layer is bent, thereby preventing distortion in the surrounding material as it transitions from one surface to another.

SUMMARY

To address the above issues, according to one aspect of the present disclosure, a three-dimensional (3D) textile preform for a composite part comprises a flange portion and a stiffener portion extending upwardly from the flange portion. The stiffener portion comprises a first wall portion that extends from the flange portion and a second wall portion that extends from the flange portion at a location spaced from the first wall portion. A connecting portion connects the first wall portion and the second wall portion at a location spaced from the flange portion.

According to another aspect of the present disclosure, a composite part for a vehicle comprises a composite skin comprising one or more material layers. A composite load-bearing structure is coupled to the composite skin. The composite load-bearing structure comprises a 3D textile preform. The 3D textile preform comprises a flange portion adjacent to the one or more material layers of the composite skin. A stiffener portion extends upwardly from the flange portion. The stiffener portion comprises a first wall portion that extends from the flange portion and a second wall portion that extends from the flange portion at a location spaced from the first wall portion. A connecting portion connects the first wall portion and the second wall portion at a location spaced from the flange portion. The composite part further comprises a cured polymer matrix at least partially surrounding the one or more material layers of the composite skin and the 3D textile preform.

According to another aspect of the present disclosure, a vehicle comprises a composite part. The composite part comprises a composite skin comprising one or more material layers and a composite load-bearing structure coupled to the composite skin. The composite load-bearing structure comprises a 3D textile preform. The 3D textile preform comprises a flange portion adjacent to the one or more material layers of the composite skin. A stiffener portion extends upwardly from the flange portion. The stiffener portion comprises a first wall portion that extends from the flange portion and a second wall portion that extends from the flange portion at a location spaced from the first wall portion. A connecting portion connects the first wall portion and the second wall portion at a location spaced from the flange portion. The composite part further comprises a cured polymer matrix at least partially surrounding the one or more material layers of the composite skin and the 3D textile preform.

According to another aspect of the present disclosure, a method of forming a 3D textile preform for a composite part comprises weaving or braiding a 3D textile. The 3D textile comprises a flange portion and a stiffener portion extending upwardly from the flange portion. The stiffener portion comprises a first wall portion that extends from the flange portion. A second wall portion extends from the flange portion at a location spaced from the first wall portion. A connecting portion connects the first wall portion and the second wall portion at a location spaced from the flange portion.

The features, functions, and advantages that have been discussed can be achieved independently in various embodiments or can be combined in yet other embodiments, further details of which can be seen with reference to the following description and drawings.

DETAILED DESCRIPTION

Figure 1:
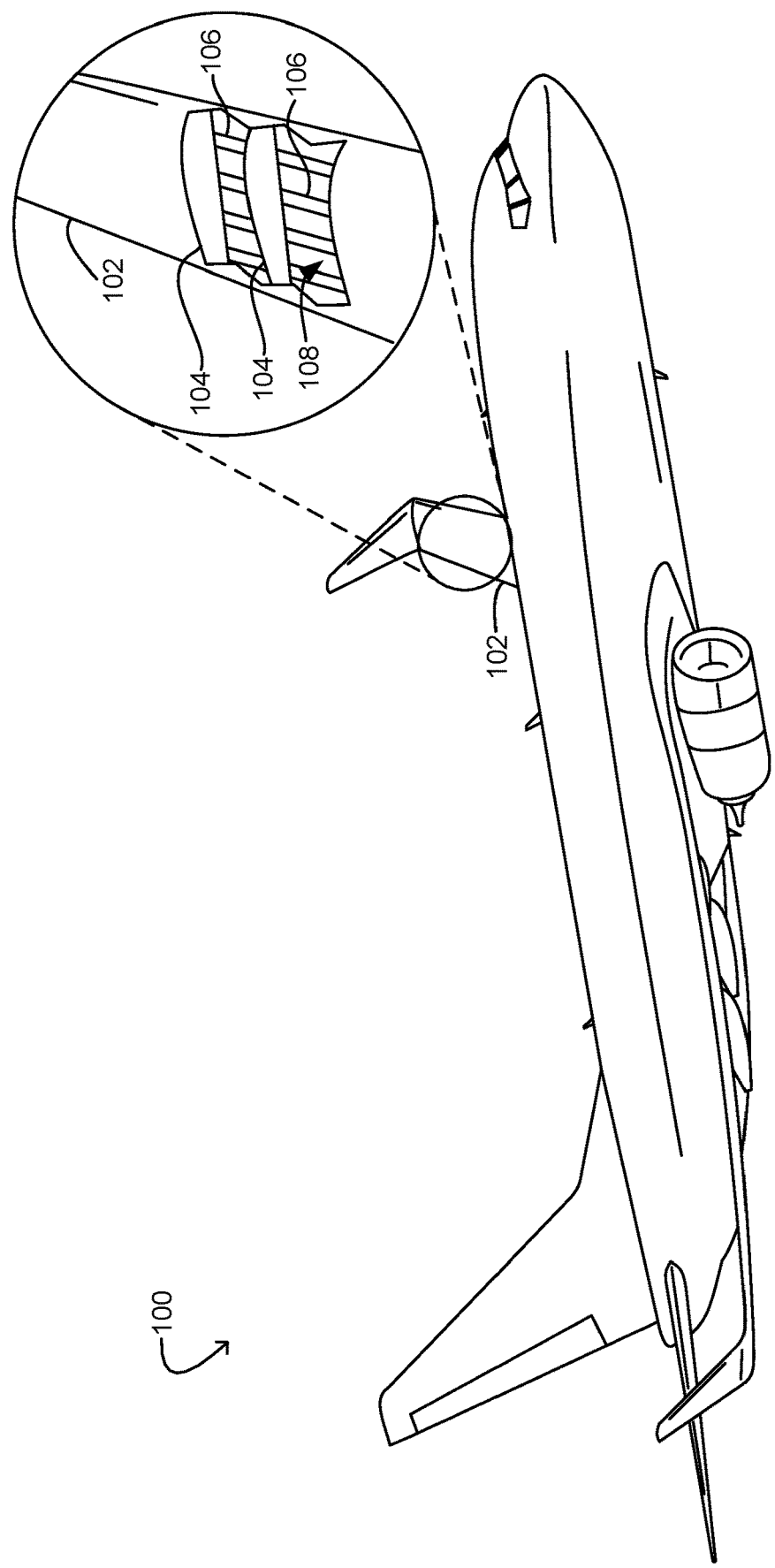
FIG. 1 shows an example of a vehicle according to the present disclosure.

As introduced above, various components of a vehicle can be made from composite materials. FIG. 1 shows one example of a vehicle in the form of an aircraft 100 comprising composite parts. In other examples, the vehicle can take the form of a ground-based vehicle (e.g., a car or truck), a drone, a surface watercraft, a submarine, a spacecraft, or any other suitable vehicle. Although, an aircraft and stringers are used as an example, it is contemplated that the approach here could apply to other vehicles and structures.

The aircraft 100 includes a wing 102. The wing 102 comprises a framework of load-bearing components, including a plurality of frame components 104 and stiffeners in the form of stringers 106. The stringers 106 stiffen a lower skin 108 of the aircraft and transfer loads from the skin 108 to the frame components 104 to distribute loads throughout the aircraft 100.

In some examples, the skin 108, the stringers 106, and/or any other suitable components of the aircraft 100 are formed from composite materials. For example, and as introduced above, the skin 108 and one or more stiffeners (e.g., stringers 106) are formed as a unitary composite structure by constructing a preform that includes the skin and the one or more stiffeners, infusing the preform with liquid resin, and curing the parts together. In other examples, a composite skin and composite stiffener can be formed and cured separately, and then joined after both parts are cured.

Forming such a potentially complex composite part can pose various challenges. For example, as mentioned above, some fiber layers for use in composites have limits regarding how tight of an angle can be formed by the fiber layer, requiring a radiused bend to be used where the fiber layer changes direction. Introducing a radius between two or more components of a stiffener can result in an open or enclosed void, also referred to a deltoid, in the resulting composite part. The deltoid can be strengthened by packing the void with a filler material, such as a "noodle" (an elongated filler shaped to fit the void).

In contrast with such approaches, a technical effect of embodiments herein includes reduced costs and manufacturing steps compared to traditional forming techniques by avoiding the use of a noodle or other filler that can comprise a different material than the rest of the composite part. As such a filler can add weight, and require modifications to cure cycles, processing temperatures and/or pressures, other technical effects of embodiments herein include reduced weight and manufacturing times. Yet other technical effects include avoiding the matching of coefficients of thermal expansion, stiffnesses, and/or other properties compared to the use of fillers.

Accordingly, examples are disclosed that relate to the use of 3D textile preforms in composite parts for vehicles. Briefly, a 3D textile preform according to the present disclosure comprises a flange portion and a stiffener portion extending upwardly from the flange portion. The stiffener portion comprises a first wall portion that extends from the flange portion and a second wall portion that extends from the flange portion at a location spaced from the first wall portion. A connecting portion connects the first wall portion and the second wall portion at a location spaced from the flange portion. In some examples, the stiffener portion further comprises a web portion extending from the connecting portion, with a bulb portion located at a distal end of the web.

The use of 3D textile preforms allows for the convenient fabrication of complex composite parts in a time and cost-saving manner compared to the use of individual fiber layers. For example, a 3D textile preform having a complex shape can be formed as a unitary structure using a single pass on a weaving or braiding apparatus. Further, the 3D textile preform can be formed in curved shapes without wrinkling. In addition, the 3D textile preform can be formed without introducing voids (e.g., a deltoid) in the structure, obviating the use of a noodle or other filler materials.

As mentioned above, a 3D textile preform can be woven, e.g., using orthogonal 3D weaving techniques, or braided. In a 3D woven structure, a set of warp fibers, weft fibers, and binder fibers are interlaced in three dimensions. The warp fibers and weft fibers form each of a plurality of two-dimensional layers (e.g., in the XY plane), while the binder fibers interlace the structure in a through-thickness (e.g., Z-axis) direction. In such a braided structure, three or more sets of yarn are inter-plaited.

In contrast to other techniques, such as a stitching process in which two-dimensional textile layers are joined together by a sewing process utilizing a needle weaving or braiding can allow all parts of a complex 3D textile preform to be made integral to a single structure without stitching layers together with a needle. Nevertheless, stitching also can be used to form a 3D textile preform in some examples by stitching together multiple two-dimensional (2D) fiber layers.

As one example of a 3D preform, a preform for a stringer is formed by 3D textile manufacturing processes. In contrast with the use of 2D fiber layers to form such structures, fabricating a 3D textile preform does not introduce voids (e.g., a deltoid) in the structure, thereby allowing the omission of a noodle or other filler. When incorporated in a composite part, the absence of voids can increase resistance to delamination and interlaminar fracturing, and increase tolerance to tensile strain. In addition, the 3D textile preform renders the composite part more resistant to ballistic and impact damage than a similarly shaped laminar composite.

Figure 2:
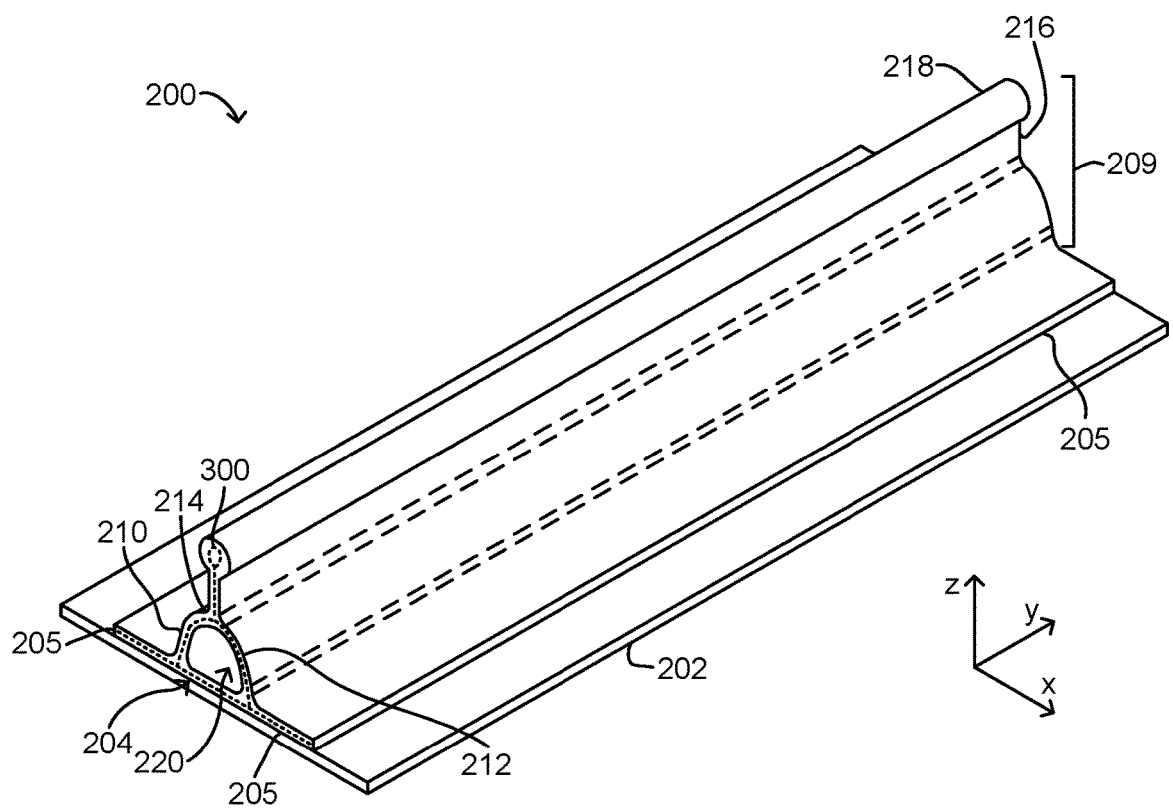
FIG. 2 shows an example of a composite part comprising a 3D textile preform according to the present disclosure.

FIG. 2 shows a perspective view of an example of a composite part 200 according to the present disclosure. The composite part 200 in the illustrated example is a stringer, but as mentioned above, the composite part 200 can be any other suitable part of a vehicle. The composite part 200 comprises a composite skin 202 and a composite load-bearing structure 204. The composite skin 202 comprises one or more fiber layers contained within a hardened resin matrix and can be formed from any suitable materials. Examples of suitable fiber materials include carbon fiber, fiberglass, polyimide fibers, aramid fibers, basalt, and polypropylene fibers.

In some examples, the composite skin 202 comprises two or more different fiber materials. Examples of suitable resin materials include epoxies, bis-maleimides (BMI), benzoxazines, phenolics, polyimides, phthalonitrile, other thermoplastic or thermosetting resins or adhesives, and combinations thereof.

The composite load-bearing structure 204 comprises a 3D textile preform (schematically depicted at 300) contained within a hardened resin matrix, instead of individual layers of fiber material. The 3D textile preform 300 is described in more detail below with reference to FIG. 3. The depicted example composite load-bearing structure comprises a flange 205 and a stiffener 209 extending upwardly from the flange 205. The flange 205 is secured to the composite skin 202. In some examples, the flange 205 is secured to the composite skin by co-infusion of the 3D preform 300 of the composite load-bearing structure 204 and a preform for the skin 202. In other examples the flange 205 is secured to the skin after forming the composite load-bearing structure 204 and the skin 202 separately.

The composite load-bearing structure further comprises a first wall 210, a second wall 212, and a connector 214 extending between the first wall 210 and the second wall 212. The first wall 210, the second wall 212, and the connector 214 define a channel 220 above the flange 205. The channel extends through the composite structure along a long dimension of the structure (e.g., the y-axis direction, which corresponds to a length of a stringer). In some examples, other structures (e.g., vehicle components or systems, for example wires) can be routed inside the channel (e.g., to and through), which can help free space outside of the composite part and potentially reduce weight and other stresses applied to the composite part.

The composite load-bearing structure further comprises a web 216 extending from the connector 214. The web 216 comprises a bulb 218 at a distal end, which can help strengthen the stiffener by increasing a mass of the web.

Figure 3:
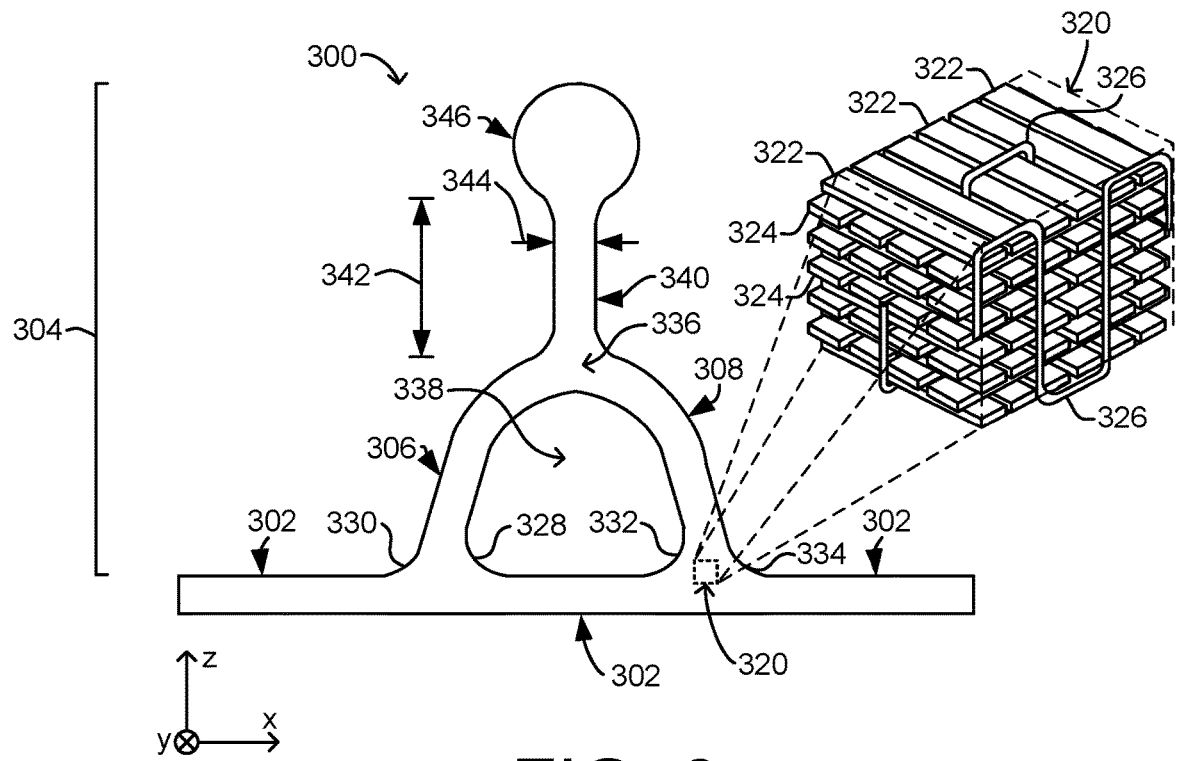
FIG. 3 shows an end view of a preform suitable for use in the composite part of FIG. 2.

FIG. 3 shows an end view of the 3D textile preform 300 of FIG. 2. The 3D textile preform 300 is infused with a resin matrix and joined with a composite skin (either by co-infusion or joined after resin infusion) to form a composite load-bearing structure.

The 3D textile preform 300 comprises a flange portion 302 and a stiffener portion 304. The flange portion 302, when infused with a resin matrix that is cured or otherwise hardened, forms a flange within a composite load-bearing structure. Likewise, the stiffener portion 304 forms a stiffener within the composite load-bearing structure.

The stiffener portion 304 comprises a first wall portion 306 and a second wall portion 308 that extend from the flange portion 302. As introduced above, by using 3D textile fabrication techniques such as 3D weaving or 3D braiding, the flange portion 302 and the stiffener portion 304 are integrally formed. The illustrated example is devoid of deltoids where the first wall portion 306 and the second wall portion 308 meet the flange portion 302.

As shown in cutout 320, the 3D textile preform 300 comprises a plurality of warp fibers 322, a plurality of weft fibers 324, and a plurality of binder fibers 326. In some examples, each of the warp fibers 322, the weft fibers 324, and the binder fibers 326 comprises a carbon fiber yarn. In other examples, the fibers comprise any other suitable material, examples of which include yarns formed from glass fibers, polyimide fibers, aramid fibers, basalt, and polypropylene fibers. In yet other examples, the warp fibers 322, the weft fibers 324, or the binder fibers 326 comprise two or more different materials. The term "fiber" as used herein represents any fibrous material used in a 3D textile. In other examples, the 3D textile preform 300 can be braided or sewn, rather than woven.

In the example of FIG. 3, the warp fibers 322 and the weft fibers 324 are orthogonal to each other but can have any other suitable relative orientation in other examples. The binder fibers 326 interlace with the warp fibers 322 and the weft fibers 324 in a through-thickness direction. By weaving the 3D textile preform in this way, all components of the 3D textile preform are integral to a common textile structure. With this configuration, stresses on the stiffener portion 304 can be distributed along the flange portion 302, thereby increasing resilience in a composite formed from the 3D textile preform 300 over laminar composites.

In some examples, mode I interlaminar fracture toughness and crack propagation values (G1C) were increased up to 20 times over two-dimensional reinforced epoxy laminates as measured using ASTM standard test method D5528-13. The interlaced binder fibers 326 also help to increase strength between layers of the warp fibers 322 and the weft fibers 324, which can increase impact resistance relative to laminar composites (e.g., as determined by compression after impact (CAI); ASTM standard test method D7137).

In some examples, the warp fibers 322, weft fibers 324, and binder fibers 326 can form a mesh structure that can be bent or stretched to an extent after the 3D textile preform is fabricated without damaging the preform or introducing wrinkles. Further, as mentioned above, a 3D textile preform can be formed in shapes that can pose difficulties for conventional 2D fiber sheets.

Figure 4:
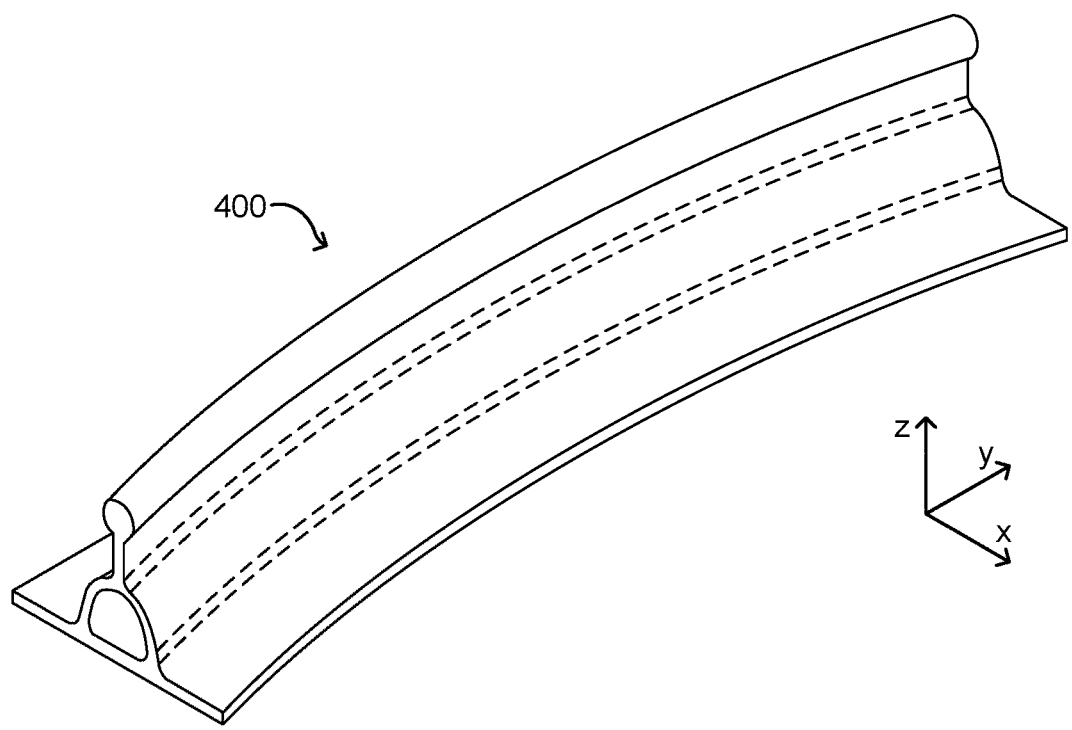
FIG. 4 shows a perspective view of an example 3D textile preform including curvature along a stringer length.

For example, FIG. 4 shows a 3D textile preform 400 formed to have curvature along its length. Depending upon the amount of curvature and the 3D textile process used to form a preform, such curvature also can be imparted to a straight preform in some examples. In contrast, forming such a structure with conventional 2D fiber sheets can cause the sheets to wrinkle.

With reference again to FIG. 3, the 3D textile preform 300 comprises radii where the first wall portion 306 meets the flange portion 302 and where the second wall portion 308 meets the flange portion 302. More specifically, the 3D textile preform 300 comprises a first internal radius 328 between the first wall portion 306 and the flange portion 302, located on an internal side of the stiffener portion that faces the second wall portion 308. The 3D textile preform 300 further comprises a first external radius 330 between the first wall portion 306 and the flange portion 302. The first external radius 330 is located on an external side of the stiffener portion that faces away from the second wall portion 308. The first internal radius 328 and the first external radius 330 help to distribute force where the first wall portion 306 meets the flange portion 302.

Likewise, the 3D textile preform 300 comprises a second internal radius 332 between the second wall portion 308 and the flange portion 302. The second internal radius 332 is located on an internal side of the stiffener portion that faces the first wall portion 306. A second external radius 334 is located between the second wall portion 308 and the flange portion 302 on an external side of the stiffener portion that faces away from the first wall portion 306. The second internal radius 332 and the second external radius 334 help to distribute force where the second wall portion 308 meets the flange portion 302. With both the external and internal radii where wall portions meet the flange portion, no deltoids exist where the flange portions and web portion meet.

The second wall portion 308 is spaced from the first wall portion 306 at distal ends of the wall portions. As such, a connecting portion 336 connects the first wall portion 306 and the second wall portion 308 at the distal ends of the wall portions. In this manner, the first wall portion 306, the second wall portion 308, and the connecting portion 336 define a channel 338 above the flange portion 302.

The channel 338 extends through the 3D textile preform 300 along a long dimension of the preform (e.g., the y-axis direction, which corresponds to a length of a stringer). In the illustrated example, the channel 338 is enclosed by the flange portion 302, the first wall portion 306, the second wall portion 308, and the connecting portion 336 along the length of the 3D textile preform but is open at both ends of the 3D textile preform. In other examples, the channel can be enclosed at the ends of the 3D textile preform and/or include one or more openings along the length of the preform.

In some examples, one or more vehicle systems can be installed within the channel 338. For example, one or more electrical cables, fuel and/or other fluid lines, pneumatic tubing, and/or mechanical parts (e.g., manual control cables) of an aircraft can be routed through the channel. In this manner the composite part formed from the preform 300 can help to protect any components that are routed through the channel. Further, components can be routed through the channel that would otherwise be attached to an exterior portion of the composite part (e.g., via clips or brackets), reducing weight and other stresses applied to the composite part and freeing space outside of the composite part. In some examples, the channel can be hermetically sealed and/or vaporproof, allowing fluids and/or gasses (e.g., jet fuel or nitrogen gas) to be directly transferred through the channel.

In the 3D textile preform 300 of FIG. 3, the first wall portion 306, the second wall portion 308, and the connecting portion 336 together comprise a top-hat cross-section. In other examples, the 3D textile preform can have any other suitable cross-sectional shape.

Figure 5:
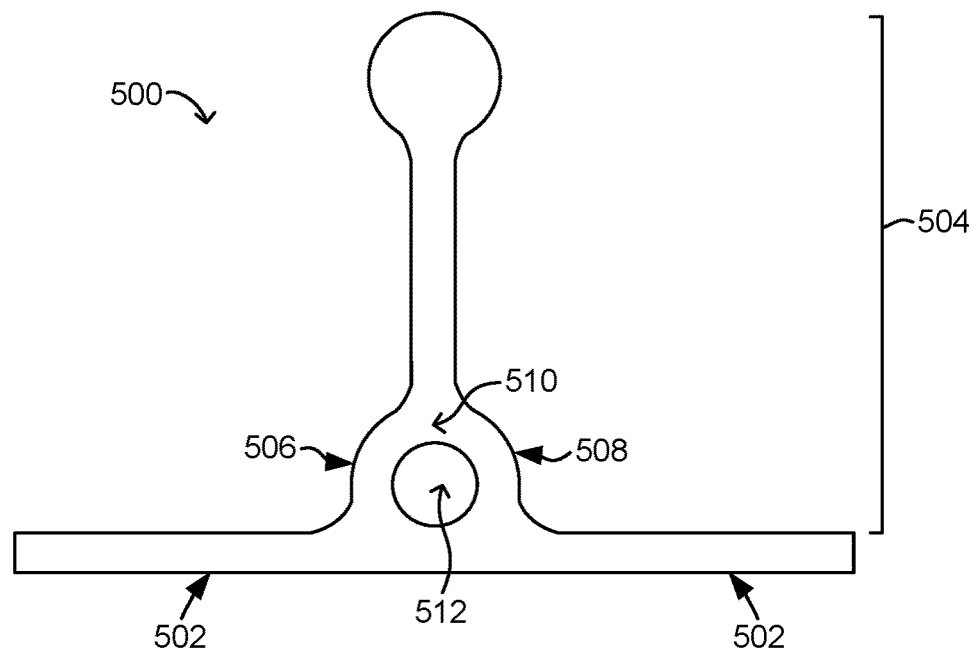
FIG. 5 shows an end view of another example 3D textile preform.

For example, FIG. 5 shows another example of a 3D textile preform 500 comprising an elliptical channel. Like the 3D textile preform 300 of FIG. 3, the 3D textile preform 500 comprises a flange portion 502 and a stiffener portion 504 extending upwardly from the flange portion 502. The stiffener portion 504 comprises a first wall portion 506 and a second wall portion 508 that extend from the flange portion 502. The first wall portion 506 and the second wall portion 508 are joined at a connecting portion 510 of the 3D textile preform 500. As shown in FIG. 5, the first wall portion 506, the second wall portion 508, and the connecting portion 510 form an elliptical channel 512 above the flange portion 502.

Returning to the example of FIG. 3, the 3D textile preform 300 further comprises a web portion 340 extending from the connecting portion 336. The web portion 340 extends from the top of the connecting portion 336 in the positive Z-axis direction. FIG. 3 shows a height 342 of the web portion 340 above the connecting portion 336 of the 3D textile preform. In some examples, the height 342 is in a range of 0.01 to 6.0 inches. In other examples, the height 342 is in a range of 0.03 to 4.8 inches. In yet other examples, the height 342 is in a range of 2.0 to 3.0 inches. It will also be appreciated that the height 342 can have any other suitable value.

In some examples, the web portion 340 comprises a consistent thickness 344 (e.g., 0.3 inches) along at least a portion of its height. The height 342 and the thickness 344 of the web portion 340 both contribute to a stiffness (e.g., as defined by the product EI of Young's modulus (E) and the second moment of area (I)) of the composite part formed from the preform 300. In some examples, the thickness 344 is in a range of 0.01 to 6.0 inches. In other examples, the thickness 344 is in a range of 0.03 to 1.0 inches. In yet other examples, the thickness 344 is in a range of 0.1 to 0.5 inches. In other examples, the thickness 344 can have any other suitable value.

Figure 6:
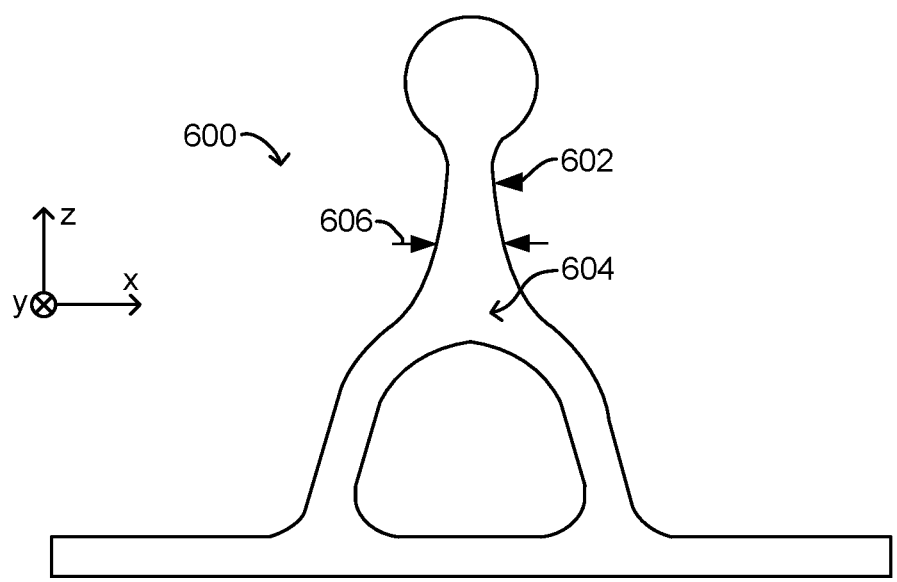
FIG. 6 shows an end view of an example 3D textile preform comprising a tapered web portion.

Further, in yet other examples, the web portion comprises a thickness that varies along its height. FIG. 6 shows another example of a 3D textile preform 600 comprising a tapered web portion 602. Like the web portion 340 of FIG. 3, the tapered web portion 602 extends from a connecting portion 604 of the 3D textile preform 600. However, the tapered web portion 602 comprises a thickness 606 that decreases as a function of distance from the connecting portion 604.

With reference again to FIG. 3, the 3D textile preform 300 further comprises a bulb portion 346 located at a distal end of the web portion 340, opposite to the connecting portion 336. The bulb portion 346 increases a mass of the stiffener portion 304 of the 3D textile preform, and thereby increases stiffness of the resulting composite part. In some examples, by increasing a mass of the bulb portion 346, the stiffness of the composite part is increased without increasing the height 342 of the web portion 340. In this manner, the composite part formed from the preform 300 can be able to fit within confined spaces, such as inside of a small aircraft.

In some examples, the bulb portion 346 further increases damage tolerance of the composite part formed from the preform 300. For example, impact forces can be dissipated by the bulb portion 346, which can help to prevent delamination and other damage that could potentially occur in a laminar composite structure. In addition, an impact can leave a visible mark on a surface of the bulb portion 346, thereby making it easy to identify and assess the effects of any damage sustained.

In the example of FIG. 3, the bulb portion 346 comprises an elliptical shape. The elliptical bulb portion can dissipate impact forces received from any angle around the bulb. In some examples, the bulb portion 346 comprises a radius of 0.01 to 3.0 inches. In other examples, the radius is in a range of 0.03 to 0.6 inches. In yet other examples, the radius is in a range of 0.3 to 0.5 inches. In other examples, the bulb portion 346 comprises any other suitable radius. Further, in other examples a bulb portion can have any other suitable shape.

The web thickness 344, the web height 342, the bulb radius, and/or any other suitable dimension of the 3D textile preform 300 can be tailored to meet one or more mechanical, thermal, or design specifications for a vehicle. For example, the dimensions of the 3D textile preform 300 can be determined based on a size of an aircraft, the aircraft's wing length, fuselage curvature, etc. In some examples, these dimensions are determined using a computational algorithm.

Figure 7:
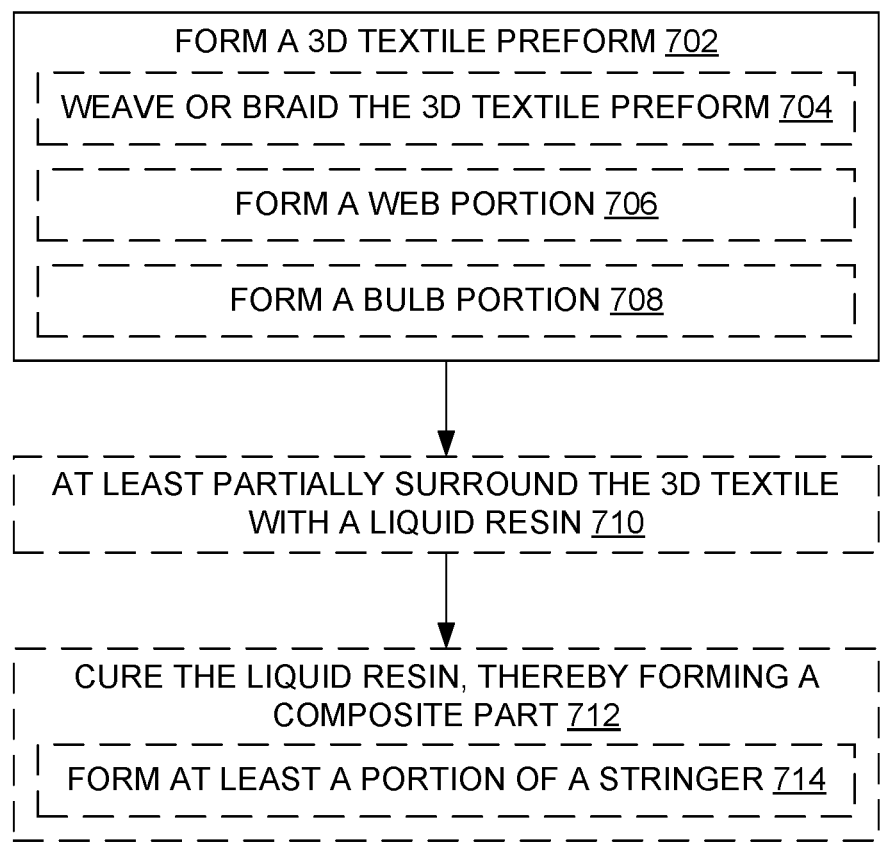
FIG. 7 illustrates a flow diagram depicting an example method of forming a 3D textile preform for a composite part according to the present disclosure.

FIG. 7 illustrates a flow diagram depicting an example method 700 of forming a 3D textile preform for a composite part. It will be appreciated that the following description of method 700 is provided by way of example and is not meant to be limiting. It will be understood that various steps of method 700 can be omitted or performed in a different order than described, and that the method 700 can include additional and/or alternative steps relative to those illustrated in FIG. 7 without departing from the scope of this disclosure.

At 702, the method 700 includes forming a 3D textile preform. As described above, the 3D textile preform comprises a flange portion and a stiffener portion extending upwardly from the flange portion. The stiffener portion comprises a first wall portion that extends from the flange portion. A second wall portion extends from the flange portion at a location spaced from the first wall portion. A connecting portion connects the first wall portion and the second wall portion at a location spaced from the flange portion. As indicated at 704, forming the 3D textile preform can comprise weaving or braiding the 3D textile preform. As described above, in other examples, forming the 3D textile preform can include sewing the 3D textile preform or forming the 3D textile preform using any other suitable technique.

At 706, the method 700 optionally includes forming a web portion extending from the connecting portion. In some such examples, as indicated at 708, the method 700 includes forming a bulb portion located at a distal end of the web portion.

The method 700 includes, at 710, at least partially surrounding the 3D textile with a liquid resin. At 712, the method 700 includes curing or otherwise hardening the liquid resin to form a polymer matrix, thereby forming a composite part from the 3D textile preform. As described above and as indicated at 714, the composite part can comprise at least a portion of a stringer or any other suitable part.

The use of 3D textile preforms according of the present disclosure can allow for the convenient fabrication of complex composite parts in a time and cost-saving manner compared to the use of individual fiber layers, which can require more complex and time-consuming lay-up. In addition, by weaving or braiding the 3D textile preform, a composite part can be formed without introducing voids, thereby increasing resistance to delamination and interlaminar fracturing relative to a similarly shaped laminar composite without having to use a void filler, such as a noodle.

Further, the disclosure comprises configurations according to the following clauses.

Clause 1. A 3D textile preform for a composite part, the 3D textile preform comprising:
a flange portion; and
a stiffener portion extending upwardly from the flange portion, the stiffener portion comprising:
a first wall portion that extends from the flange portion,
a second wall portion that extends from the flange portion at a location spaced from the first wall portion, and
a connecting portion that connects the first wall portion and the second wall portion at a location spaced from the flange portion.

Clause 2. The 3D textile preform of clause 1, wherein the 3D textile preform is woven or braided.

Clause 3. The 3D textile preform of clause 2, wherein the 3D textile preform is woven and comprises weft fibers, warp fibers, and binder fibers.

Clause 4. The 3D textile preform of clause 1, wherein the 3D textile preform comprises one or more of carbon fibers, aramid fibers, or glass fibers.

Clause 5. The 3D textile preform of clause 1, wherein the 3D textile preform forms at least a portion of a stringer.

Clause 6. The 3D textile preform of clause 1, wherein the web portion comprises a thickness that tapers between the connecting portion and the bulb portion.

Clause 7. The 3D textile preform of clause 1, wherein the stiffener portion further comprises a web portion extending from the connecting portion.

Clause 8. The 3D textile preform of clause 7, wherein the stiffener portion further comprises a bulb portion located at a distal end of the web portion.

Clause 9. The 3D textile preform of clause 1, further comprising:
a first radius where the first wall portion and the flange portion meet; and
a second radius where the second wall portion and the flange portion meet.

Clause 10. The 3D textile preform of clause 1, wherein the first wall portion, the second wall portion, the flange portion, and the connecting portion define a channel.

Clause 11. A composite part for a vehicle, the composite part comprising:
a composite skin comprising one or more material layers;
a composite load-bearing structure coupled to the composite skin, the composite load-bearing structure comprising a three-dimensional (3D) textile preform, the 3D textile preform comprising:
a flange portion adjacent to the one or more material layers of the composite skin, and
a stiffener portion extending upwardly from the flange portion, the stiffener portion comprising
a first wall portion that extends from the flange portion,
a second wall portion that extends from the flange portion at a location spaced from the first wall portion, and
a connecting portion that connects the first wall portion and the second wall portion at a location spaced from the flange portion; and
a cured polymer matrix at least partially surrounding the one or more material layers of the composite skin and the 3D textile preform.

Clause 12. The composite part of clause 11, wherein the 3D textile preform is woven or braided.

Clause 13. The composite part of clause 12, wherein the 3D textile preform is woven and comprises weft fibers, warp fibers, and binder fibers.

Clause 14. The composite part of clause 11, wherein the composite load-bearing structure forms at least a portion of a stringer.

Clause 15. The composite part of clause 11, wherein the stiffener portion further comprises a web portion extending from the connecting portion.

Clause 16. The composite part of clause 15, wherein the stiffener portion further comprises a bulb portion located at a distal end of the web portion.

Clause 17. The composite part of clause 11, wherein the first wall portion, the second wall portion, the flange portion, and the connecting portion define a channel.

Clause 18. A vehicle, comprising:
a composite part, the composite part comprising,
a composite skin comprising one or more material layers; and
a composite load-bearing structure coupled to the composite skin, the composite load-bearing structure comprising a three-dimensional (3D) textile preform, the 3D textile preform comprising
a flange portion adjacent to the one or more material layers of the composite skin, and
a stiffener portion extending upwardly from the flange portion, the stiffener portion comprising
a first wall portion that extends from the flange portion,
a second wall portion that extends from the flange portion at a location spaced from the first wall portion, and
a connecting portion that connects the first wall portion and the second wall portion at a location spaced from the flange portion; and
a cured polymer matrix at least partially surrounding the one or more material layers of the composite skin and the 3D textile preform.

Clause 19. The vehicle of clause 18, wherein the 3D textile preform is woven or braided.

Clause 20. The vehicle of clause 19, wherein the 3D textile preform is woven and comprises weft fibers, warp fibers, and binder fibers.

Clause 21. A method of forming a three-dimensional (3D) textile preform for a composite part, the method comprising:
forming the 3D textile preform, the 3D textile preform comprising:
a flange portion; and
a stiffener portion extending upwardly from the flange portion, the stiffener portion comprising,
a first wall portion that extends from the flange portion,
a second wall portion that extends from the flange portion at a location spaced from the first wall portion, and
a connecting portion that connects the first wall portion and the second wall portion at a location spaced from the flange portion.

Clause 22. The method of clause 21, wherein forming the 3D textile preform comprises weaving or braiding the 3D textile preform.

Clause 23. The method of clause 21, further comprising forming a web portion extending from the connecting portion.

Clause 24. The method of clause 23, further comprising forming a bulb portion located at a distal end of the web portion.

Clause 25. The method of clause 21, further comprising:
at least partially surrounding the 3D textile preform with a liquid resin; and
curing the liquid resin to form a polymer matrix, thereby forming a composite part from the 3D textile preform.

Clause 26. The method of clause 25, wherein forming the composite part comprises forming at least a portion of a stringer.

It will be understood that the configurations and/or approaches described herein are exemplary in nature, and that these specific embodiments or examples are not to be considered in a limiting sense, because numerous variations are possible. The specific routines or methods described herein can represent one or more of any number of strategies. As such, various acts illustrated and/or described can be performed in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems, and configurations, and other features, functions, acts, and/or properties disclosed herein, as well as any and all equivalents thereof.

The invention claimed is:

1. A three-dimensional (3D) textile preform for a composite part, the 3D textile preform comprising:
   a flange portion; and
   a stiffener portion integrally formed with the flange portion, the stiffener portion comprising:
      a first wall portion that extends from the flange portion,
      a second wall portion that extends from the flange portion at a location spaced from the first wall portion,
      a connecting portion that connects the first wall portion and the second wall portion at a location spaced from the flange portion, and
      a web portion integrally formed with the connecting portion, the web portion extending away from the connecting portion and the flange portion.

2. The 3D textile preform of claim 1, wherein the 3D textile preform comprises one or more of carbon fibers, aramid fibers, or glass fibers.

3. The 3D textile preform of claim 1, wherein the 3D textile preform forms at least a portion of a stringer.

4. The 3D textile preform of claim 1, wherein the stiffener portion further comprises a bulb portion located at a distal end of the web portion.

5. The 3D textile preform of claim 1, further comprising:
   a first radius where the first wall portion and the flange portion meet; and
   a second radius where the second wall portion and the flange portion meet.

6. The 3D textile preform of claim 1, wherein the first wall portion, the second wall portion, the flange portion, and the connecting portion define a channel.

7. The 3D textile preform of claim 1, wherein the 3D textile preform is woven or braided.

8. The 3D textile preform of claim 7, wherein the 3D textile preform is woven and comprises weft fibers, warp fibers, and binder fibers.

9. The 3D textile preform of claim 1, wherein a thickness of the web portion tapers in a direction extending from the connecting portion.

10. The 3D textile preform of claim 9, wherein the stiffener portion further comprises a bulb portion located at a distal end of the web portion, the bulb portion comprising a thickness that is greater than the thickness of the web portion.

11. A composite part for a vehicle, the composite part comprising:
    a composite skin comprising one or more material layers;
    a composite load-bearing structure coupled to the composite skin, the composite load-bearing structure comprising a three-dimensional (3D) textile preform, the 3D textile preform comprising
       a flange portion adjacent to the one or more material layers of the composite skin, and
       a stiffener portion integrally formed with the flange portion, the stiffener portion comprising:
          a first wall portion that extends from the flange portion,
          a second wall portion that extends from the flange portion at a location spaced from the first wall portion,
          a connecting portion that connects the first wall portion and the second wall portion at a location spaced from the flange portion, and
          a web portion integrally formed with the connecting portion, the web portion extending away from the connecting portion and the flange portion; and
    a cured polymer matrix at least partially surrounding the one or more material layers of the composite skin and the 3D textile preform.

12. The composite part of claim 11, wherein the first wall portion, the second wall portion, the flange portion, and the connecting portion define a channel.

13. The composite part of claim 11, wherein the composite load-bearing structure forms at least a portion of a stringer.

14. The composite part of claim 11, wherein the 3D textile preform is woven or braided.

15. The composite part of claim 14, wherein the 3D textile preform is woven and comprises weft fibers, warp fibers, and binder fibers.

16. The composite part of claim 11, wherein a thickness of the web portion tapers in a direction extending from the connecting portion.

17. The composite part of claim 11, wherein the stiffener portion further comprises a bulb portion located at a distal end of the web portion.

18. A vehicle, comprising:
    a composite part, the composite part comprising,
       a composite skin comprising one or more material layers; and
       a composite load-bearing structure coupled to the composite skin, the composite load-bearing structure comprising a three-dimensional (3D) textile preform, the 3D textile preform comprising
          a flange portion adjacent to the one or more material layers of the composite skin, and
          a stiffener portion extending upwardly from the flange portion, the stiffener portion comprising
             a first wall portion that extends from the flange portion,
             a second wall portion that extends from the flange portion at a location spaced from the first wall portion,
             a connecting portion that connects the first wall portion and the second wall portion at a location spaced from the flange portion, and a web portion integrally formed with the connecting portion, the web portion extending away from the connecting portion and the flange portion; and a cured polymer matrix at least partially surrounding the one or more material layers of the composite skin and the 3D textile preform.

19. The vehicle of claim 18, wherein the 3D textile preform is woven or braided.

20. The vehicle of claim 19, wherein the 3D textile preform is woven and comprises weft fibers, warp fibers, and binder fibers.

21. A method of forming a three-dimensional (3D) textile preform for a composite part, the method comprising:
forming the 3D textile preform, the 3D textile preform comprising:
a flange portion; and
a stiffener portion integrally formed with the flange portion, the stiffener portion comprising,
a first wall portion that extends from the flange portion,
a second wall portion that extends from the flange portion at a location spaced from the first wall portion,
a connecting portion that connects the first wall portion and the second wall portion at a location spaced from the flange portion, and
a web portion integrally formed with the connecting portion, the web portion extending away from the connecting portion and the flange portion.

22. The method of claim 21, wherein forming the 3D textile preform comprises weaving or braiding the 3D textile preform.

23. The method of claim 21, further comprising forming the web portion with a thickness of the web portion tapering in a direction extending from the connecting portion.

24. The method of claim 21, further comprising forming a bulb portion located at a distal end of the web portion.

25. The method of claim 21, further comprising:
at least partially surrounding the 3D textile preform with a liquid resin; and
curing the liquid resin to form a polymer matrix, thereby forming the composite part from the 3D textile preform.

26. The method of claim 25, wherein forming the composite part comprises forming at least a portion of a stringer.

* * * * *